United States Patent
Freeman, Jr.

[15] 3,677,503
[45] July 18, 1972

[54] REACTION--IMPULSE--COUNTERROTATING--AIRFOIL

[72] Inventor: Carlos A. Freeman, Jr., P.O. Box 135, Snow Hill, Md. 21863

[22] Filed: July 31, 1968

[21] Appl. No.: 749,112

[52] U.S. Cl. ............................................. 244/23
[51] Int. Cl. ........................................... B64c 29/00
[58] Field of Search ............................... 244/12, 23

[56] References Cited

UNITED STATES PATENTS

| | | | |
|---|---|---|---|
| 3,101,917 | 8/1963 | Sudrow | 244/23 |
| 3,437,290 | 4/1969 | Norman | 244/23 |

FOREIGN PATENTS OR APPLICATIONS

| | | | |
|---|---|---|---|
| 678,700 | 1/1964 | Canada | 244/23 |

Primary Examiner—Milton Buchler
Assistant Examiner—James E. Pittenger

[57] ABSTRACT

This invention relates to a self-contained flight machine that may function in and of itself as an aircraft or that may form a part or all of the lift and/or propulsion element or elements of an aircraft. The invention consists of two separate airfoil systems, each borne upon and radially extending in the horizontal plane from a concentrically located shaft, about which they are driven in rotation and counterrotation by the reaction of two or more propulsion engines mounted upon the radial extremity of the airfoils of one of the systems; the exhaust impulse of the aforesaid engines is employed to drive the other airfoil system in counterrotation, thusly constituting an impulse reaction drive system. The drive is encompassed by an aerodynamic duct borne upon the radial extremity of the airfoils of the counterrotation system. This ducting, or collar, provides for the mounting of the deflection vanes that receive the impulse from the reaction engines, as well as ducting the airflow resultant from the combined thrust of the airfoil systems and the exhausted gases of combustion through the craft in a manner similar to that of fan or propeller driven aerodynamic ducts. A control, passenger and/or payload platform is affixed to the aforesaid concentric shaft. The aircraft takes off vertically and means are provided to cant the unit so as to travel and maneuver in the horizontal plane.

15 Claims, 7 Drawing Figures

Patented July 18, 1972

REACTION–IMPULSE–COUNTERROTATING–AIRFOIL

This invention relates to an aircraft which is a self-contained flight machine, and more particularly to a counter-rotating reaction—impulse airfoil mechanism for providing lift and aerial mobility.

An object of this invention is to provide a flight machine of superior fuel efficiency by virtue of employing the reaction of jet propulsion engines to drive a centrally borne airfoil system in rotation and, additionally, to employ as an impulse jet the exhaust of the aforesaid reaction engine to drive a separately concentrically borne airfoil system in counterrotation, thusly gainfully employing that residual energy which is wasted to the atmosphere by conventional jet propulsion means.

The reaction phase may be provided by foil tip mounted ram, pulse, or accoustic jet propulsion units, or by turbo or fan jet engines; the latter two type engines may be centrally mounted with exhaust ducted through the reaction impeller foils and jetted from the foil tip so as to cause rotary motion. In each of these cases, the exhausted products of combustion from the jet propulsion engines are at extremely high velocities relative to the linear and/or, as in this case, curvilinear displacement of the engine; therefore, the products of combustion after discharge, free and clear, of the reaction engine nozzle still contain potential energy in the form of momentum. Thusly, when this expelled moving gaseous body impinges upon appropriately oriented deflection vanes mounted in and upon a collar attached to the counterrotating airfoil system, the latter is driven by impulse: i.e.; the change in momentum of the high velocity jet gaseous mass is imparted to the counterrotating system.

A simplified mathematical expression relating to jet propulsion in any fluid medium, by which a device causes an acceleration to be imparted to that medium as it passes through the said device or engine, is applicable in general to all those jet propulsion reaction engines hereinbefore stipulated and is as follows: let $u$ = the velocity of the engine relative to the medium (air), $m$ = mass per second of air involved, $P_1$ = ram air pressure at engine intake orifice, $P_2$ = pressure at engine exhaust nozzle orifice, $v$ = velocity of jet exhaust relative to engine at nozzle orifice, $A_1$ = area of air intake, $A_2$ = area nozzle discharge orifice, $F$ = thrust;

$$F = mv - mu + (P_2A_2 - P_1A_1) + P_1(A_1 - A_2)$$ and it follows that the residual energy $(E) = \tfrac{1}{2}mt(v - u)^2$. It is this residual energy, unused by the reactive propulsion unit, that is delivered to and put to work by the impulse system. As the impulse system gains in relative counterrotational velocity, acceleration from impulse decreases until the angular velocity assumes a constant operating value.

Another object of the invention is to further increase fuel efficiency by: (a) the secondary exhaust of the still expanding impulse gases being channeled to lift advantage by the geometry of the deflecting vanes; (b) the general increase in flow and density of the ambient air within the collar structure resultant of the direct impulsion of the counterrotating airfoils and the added flow induction effected by the reaction airfoil operation; (c) the geodynamics of the aerodynamic duct configuration of the counterrotating collar.

Another object of this invention is to provide a means of a gainfully extracting the energy content from the unoxidized fuel inherent in the discharge of ramjets in particular and, to lesser extent, with regard to pulse jets, by providing deflection vanes with their lower portions cylindrically confined and of such geometry as to curve the said lower cylindrical housing, both in a convergent manner and through an angle of vertical curvature of between 160° to 180°, thusly effecting a convergent channel through which the impulse jet issuing from the reaction engine may pass and ram by inertial friction, and in the manner of a Venturi, a quantity of air with and in addition to the still expanding jet gaseous mass, thusly promoting further oxidation and consequent thermal expansion through the said lower cylindrical housing and exhausting such through a nozzle orifice provided at the extreme lower terminus of the deflection vane assembly.

Dependent upon such variables as quantity of unoxidized fuel in jet discharge and rammed air volume, a backfire or premature combustive gaseous expansion may occur; in such event the reactive thrust causual of this backfire will be advantageous and add to the counterrotational motion of the collar by virtue of the orientation of the upper segment of the deflection vane facing in reverse of the motion of the counter-rotating system.

Still another object of this invention is to provide an aircraft which is an integral flight machine. This stems from the fact that all structural components, except the payload platform and landing gear, are dynamic, functional elements of lift, mobility and/or stability; therefore, one or more of these aerodynamic units may be incorporated with a single aircraft to supply all lift and mobility, or in conjunction with conventional aircraft propulsion engines.

A further object of this invention is to create an aircraft with flight characteristics distinct from all other heavier-than-air craft, in that: (a) the major structural elements of the craft experience constant centrifugal and centripetal acceleration and thereby set up these respective forces in the plane of rotation—counterrotation, thusly establishing an extreme gyroscopic effect that tends to maintain the platform and all parallel elements in level flight attitude; (b) vertical flight is effected by increasing or decreasing the angle of attack of the reaction airfoils and directional flight along the horizontal plane by maintaining a relative differential in angle of attack so as to disbalance lift and cause canted flight in a desired direction; (c) the counterrotating airfoils are usually fixed at maximum angle of attack, but may also be variably controlled, as in the case of the reaction airfoils; (d) the collar action, in part acting as an aerodynamic duct, tends to further stabilize the craft, as well as adding to its lift component by virtue of the upper to lower duct pressure differential; (e) in that the platform might tend to rotate due to the frictional transfer to torque through the support bearing, a platform spin control mechanism is provided by a variable friction device between the platform and both rotating systems, thusly permitting control of the angular platform orientation in the horizontal plane.

Yet another object of this invention is to produce an aircraft which is able to take off vertically, hover, and proceed in horizontal flight in canted attitude, with the especially advantageous flight characteristic and ability to be maneuvered from flight in one direction to full reverse flight or to flight in any compass orientation with immediacy and without the necessity of any intermediate maneuvers or throttle control.

A still further object of this invention is to create an aircraft the size, power, range and payload of which covers the broadest spectrum, from the one or two man category to large passenger or cargo craft both for civilian and military utilization, and in the latter as transport and/or attack craft.

Still another object of this invention is to create an aerodynamic unit that employs the airfoils of its rotational system to create lift and/or horizontal flight propulsion by employing the lift phenomena, as examplified by an airplane wing, in combination with the phenomena of airfoil impeller thrust as in an airscrew reaction; the predominance of either phenomena upon the aircraft function is governed by the dimensions, geometry and angular velocity specified for each particular unit design.

Further objects, uses and advantages of this particular invention will become apparent to those skilled in the art from the following or detailed description of examplary forms embodying the invention, it being understood that the aerodynamic unit and its various appurtenances and auxiliary means may be embodied as an aircraft, or in a variety of aircraft, depending upon the requirements of such aircraft. In the appended drawings.

Figure 1:
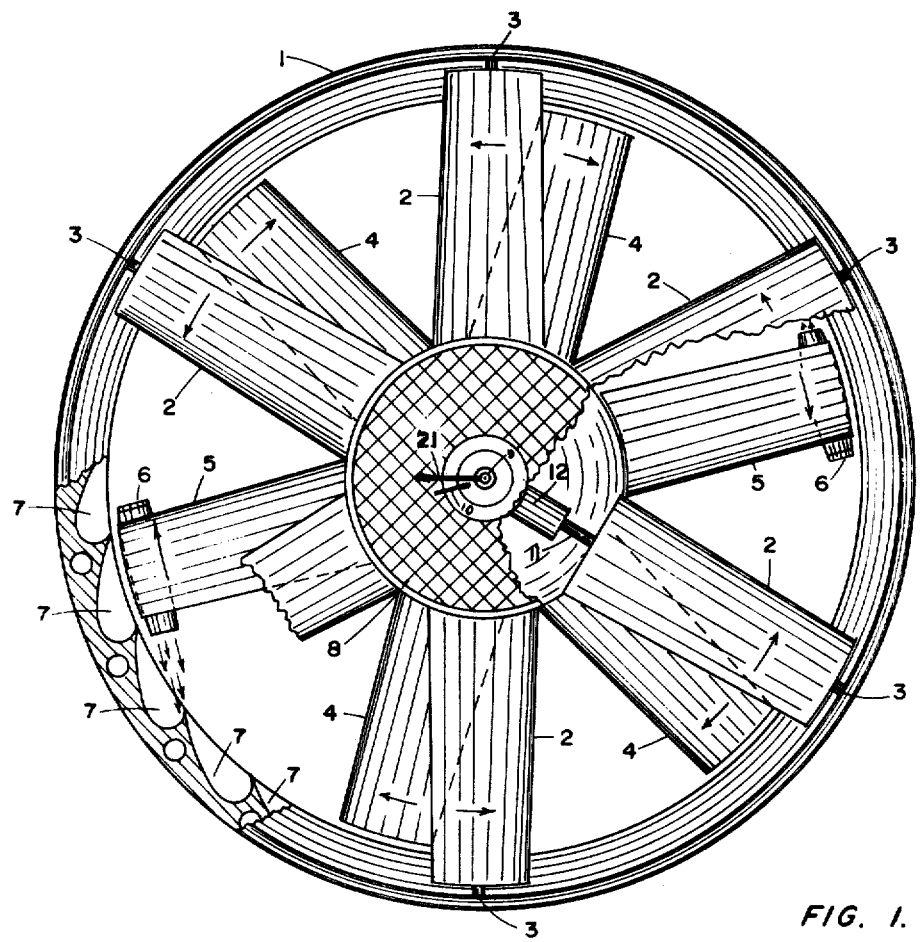
FIG. 1 is a top plan view of the aircraft, with parts partly broken away.
Figure 2:
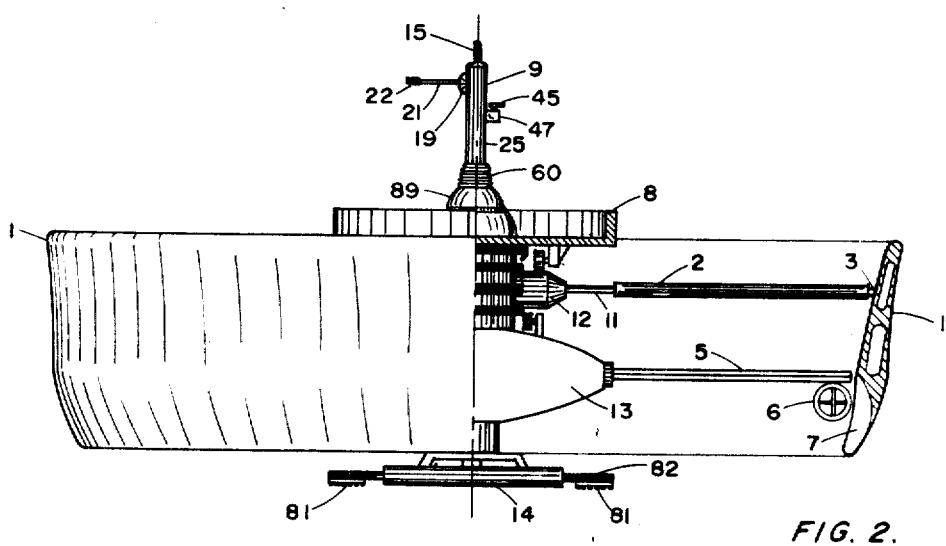
FIG. 2 is a side elevation and diametric traverse section of the aircraft with parts broken away for clarity.
Figures 3, 4:
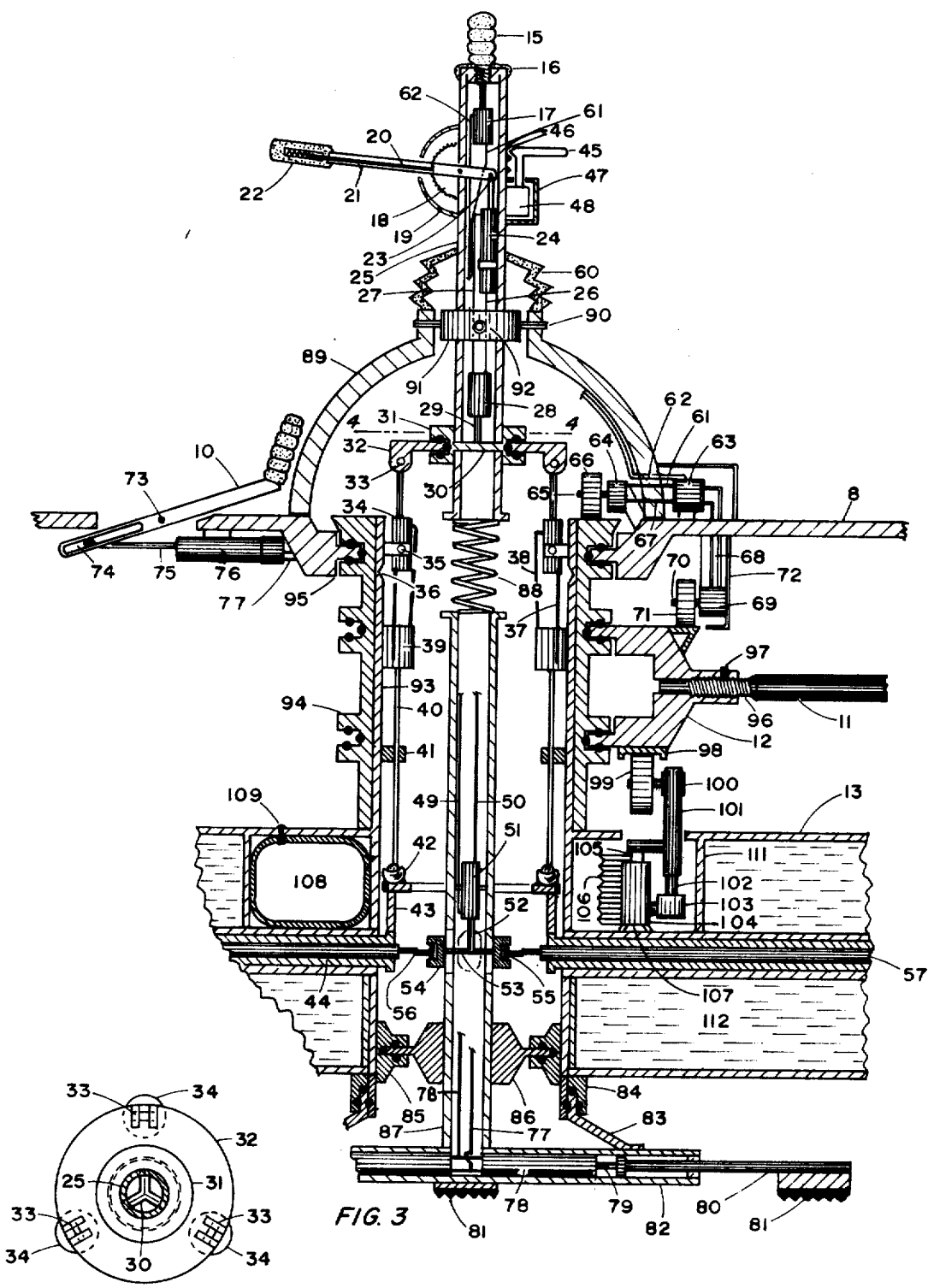
FIG. 3 is a fragmentary section through the hollow concentric shaft illustrating the bearing and attachment of principal elements and a control system.
FIG. 4 is a fragmentary plan view of the superior section of the control collar.

Refering now to the drawings, in which like numbers refer to like parts: the air flight machine comprises a main hollow shaft 93 which is concentric to all elements in curvilinear motion. Slip fit mounted upon and about the aforesaid shaft is the general bearing assembly 94 which comprises the seats of all bearing surfaces in vertical array.

The payload and navigation platform 8 is affixed to the shaft bearing housing 94 by ball bearing collar assembly 95.

The counterrotating airfoils 2 are attached to spar 11 which is borne upon and about bearing seat 94 by ball bearing collar assembly 12. In turn, the aerodynamically ducted structure 1 is held in position by an extension 3 of the aforesaid spar 11.

The configuration of the aerodynamically ducted collar 1 is such that the superior divergent section acts to channel air flow through the system and the lower segment thereof form a seat for the multitude of impulse deflection vanes 7, mounted in and about the entire lower periphery of the said structure 1.

The discoidal fuel tank structure 13 is mounted integrally with shaft 93. Within the upper inner section of this tank a sealed compartment 111 is provided, the said compartment fully encircles the tank interior. Within this encasement 111 and occupying a majority of its volume is a semi-toroidal high pressure air storage tank 108, the remainder of this compartment houses air compressor unit 106 and its automatically activated power takeoff drive 101. The compressed air storage is used for starting the engines and for inducing temporary emergency rotation in the event of low level power failure. After the engines are started and fully operating, the reduced storage air pressure having dropped below a given level automatically activates a piston in cylinder 107, the action of which drives power takeoff wheel 99 against flange friction plate 98 and the relative motion of the counterrotating systems is translated into work by wheel 99 and through the right angle gear transmission 100, thence through the slip shaft assembly 102 to the compressor drive transmission 103. When air storage is brought to the proper pressure level, an inverse procedure automatically retracts the power takeoff.

The rotating airfoil assembly tubular spar 44, which, in addition to supporting the airfoil, serves to articulate the variable angle of attack of the said airfoils, is projected from the inner hollow shaft wall through the fuel tank and thence to a bracketed bearing at the tank periphery; from this juncture the spar proceeds outwardly through the interior of the airfoils 4 to which it is affixed. Wherein jet propulsion engines 6 are mounted upon the outer extremity of certain of the airfoils 5 of the rotational system, the engine control shaft 57 is coaxially mounted within the aforesaid spar 44.

The landing gear structure 14 and its concentrically affixed and supporting hollow shaft 87 are positioned and held by exterior bearing 84 and interior bearing 85. In order to maintain this assemblage in the same relative non-rotary position with that of platform 8, a coil spring 88 is provided, which will permit the full swing and articulation of control collar assembly 32 and 31, but will prevent relative rotation between the platform and the elements of assemblage 32 and 31.

Figure 5:
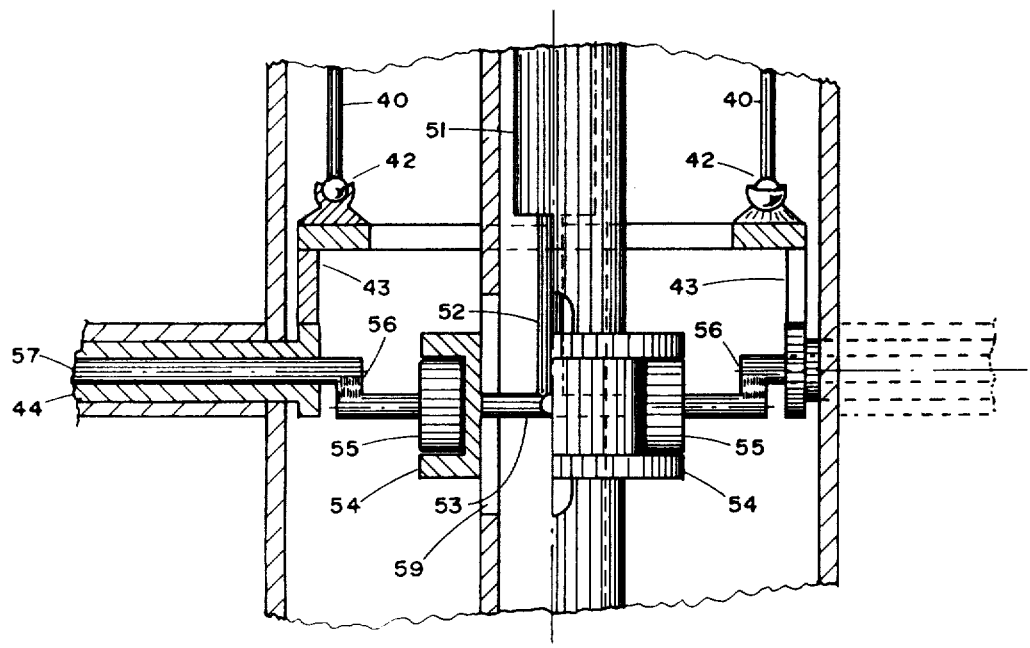
FIG. 5 is a fragmentary view of the lower control attachment.
Figure 6:
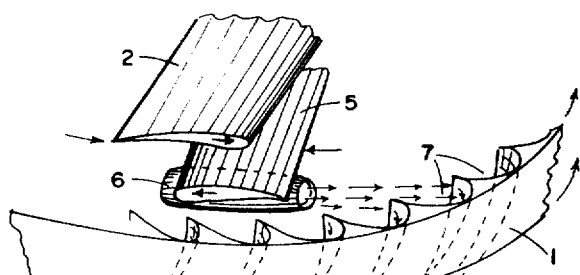
FIG. 6 is a fragmentary side view illustrating the relative positioning of the propulsion unit and segments of the airfoil systems.

Engine control is accomplished by activating control handle 45 to one of three selected positions; pulled to the up position starts the engines by causing a piston within cylinder 48 to drive hydraulic fluid through line 50 to hydraulic slave cylinder 51, raising a piston within this cylinder and thrusting rod 52 upward, which in turn raises sliding collar 54 and brings the lower flange of 54 in contact with wheel bearings 55, which in turn partially revolves control shaft 57 through the action of connecting rod 56; this action releases compressed air, fuel, and energizes the ignition firing system. A hydraulic fluid return line 49 completes the circuit. Once the engines are started and, in the case of ramjets, rotation has reached the degree of self-sustaining ram effect, the lever is depressed to the center position and this action is translated to the control shaft by the aforementioned pushpull hydraulic system, thusly shutting off the compressed air and ignition systems and setting fuel feed to predetermined operating flow. In order to stop the propulsion engines, the control handle 45 is fully depressed and again the push-pull hydraulic system translates this action to control shaft 57 which valves off all fuel flow. Tension ratchet 46 serves to hold fast the control handle setting and a guard cover 48 is provided. As further illustrated in FIG. 5, hollow shaft 87, rod 59, arm 53 and doubly flanged collar 54 are at rotational rest with platform 8 and the control column 9, whereas wheel bearing 59 and its appurtenances are in rotation with the reactively driven system.

Platform spin control is manually activated by twisting handle 15 to the right or left, which by screw action 16 motivates a push-pull hydraulic system comprising master cylinder 17, circulation lines 61 and 62 and a slave cylinder located within control center 63; through this linkage right and left twists of the control handle 15 cause regulating valves located within control center 63 to oppositely relieve and restrict the hydraulic pressure flow in circulating lines 67 and 68, which are respectively cyclicly connected to hydraulic pumps 64 and 69. These pumps are both attached to platform 8 but are each driven by their respective drive shafts 65 and 71 and takeoff wheels 66 and 70, respectively bearing upon the oppositely rotating systems, thusly a relative increase in the pumping system of one or the other caused by a differential in the circulatory flow systems will be translated to the increased torque resistance of either wheel 65 or 71, and this in turn will cause platform 8 to experience angular displacement in the direction of the resisting system's rotation. In addition to manual control, system 63 is provided with automatic direction control by gyroscopic orientation and corresponding valve linkage.

Vertical control is activated by positioning lever arm 21 in a plane vertical to the control column 9. Control lever 21 is provided with a twist release and set handle 22 with a fixed coaxial rod and pointed terminus for interaction with arc ratchet 18, which is protected by cover 19. The action of the vertical displacement of control lever 21 is transmitted both by its mechanical advantage and the hydraulic advantage of the push-pull hydraulic system comprised of master cylinder 24, transmission circuit lines 27 and 26, slave cylinder 28 and connecting rod 29 to sliding control collar and bearing assembly 30 and 31, translating the vertical lever displacement to vertical displacement along the lower projection of control column 9, all the components of the aforesaid system being at rest with the platform 8; the ball bearings interposed between this latter assembly and collar 32 permit collar 32 to continually rotate about the control column in the horizontal plane while being displaced vertically. The uniform vertical displacement of collar 32 is transmitted by three pinion borne connecting rods 33 equally spaced at 120° angles of arc about the circumference of collar 32. These rods 33 transmit the action of an advantageous push-pull hydraulic system comprised of master cylinders 34, positioned immediately below the settings of connecting rods 33, transmission circuit lines 37 and 38 and slave cylinders 39. The said action of the push-pull hydraulic system is translated by connecting rods 40 alined by guide bearings 41 to ball socket joints 42, which are affixed to lower control collar 43. The train of action of vertical displacement of collar 43 and its appendages cause tubular struts 44 to be partially revolved about their axes and consequently vary the angle of attack of the airfoils of the reactively rotated system, thereby governing vertical flight.

Horizontal flight control is accomplished by articulating control column 9 in the manner of a joy stick. Column 9 is gimbal mounted to bell housing 89 by hollow shaft 90, collar 91 and shaft 92; thusly the articulation of the upper segment of column 9 alters the plane of collar 31 and its ball bearing mounted outer rotating collar 32 and the respective attached elements thereto in such a manner as to translate the alteration of its plane to a like alteration of the plane of lower control collar 43 through the asymmetrical action superimposed upon the through the same push-pull hydraulic system as hereinbefore specified and defined for vertical lift control. The attitude of the alteration of the plane of collar 43 is such that it causes, through the respective differing angles of revolution of tubular spars 44, the angle of attack of those airfoils 4 and 5 passing the horizontal in-line flight direction to be relatively decreased, and those airfoils 4 and 5 passing in a direction opposite to the horizontal line of flight to be relatively increased, and those airfoils 4 and 5 passing at right angles to either side of the direction of the horizontal line of flight to be at equal angles of attack, this said angle to be greater than that of the horizontal in-line-of-flight airfoils 4 and 5 and less than that of the airfoils 4 and 5 in an opposite direction to the horizontal line of flight; this said angle of attack of the airfoils 4 and 5 is the same as that set by the vertical control system. Thusly, horizontal flight with the aircraft in canted position is accomplished, and this control mechanism permits near immediate change in horizontal flight direction to any desired compass orientation, including direct change to reverse flight, with a single motion of the flight column alone. Any and all three dimensional maneuvers are accomplished by the coordinated articulation of horizontal control column 9 and vertical control lever 21.

Figure 7:
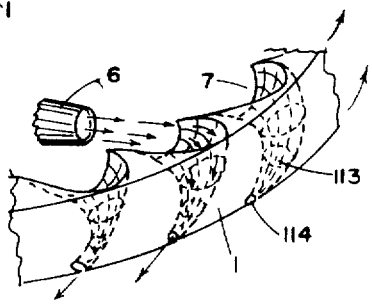
FIG. 7 is a fragmentary perspective side view of the deflection vanes and their regenerative sections.

Horizontal extension and reaction of landing gear elements 80 and 81 is accomplished by raising or lowering landing gear lever 10, which is pivoted to platform 8 by shaft 73, which activates the thrust of piston rod 75 as its pinion is impelled by the displacement of slot 74; this action displaces hydraulic fluid from one or the other of the chambers of master hydraulic cylinder 76; the said fluid displace is transmitted through hydraulic circuit lines 77 and 78, which carry along bell housing 89 through hollow shaft 90 and thence down through the interior of control collar 9 and tubular element 87 to activate pistons within cylinders 78, which in turn extend or react rods 79 attached to element 80. There are three or more supporting extensions 80 symmetrically to located about the axis of the aircraft. Refering in particular to FIG. 7, the deflection vanes 7, wherein the nature of the jet propulsion engines 6 is such that unoxidized fuel is jettisoned, or for other reasons, are so constructed as to form an enclosed, inversely curved, divergent, regenerative chamber 113, within which the incident heated gases, rammed air, and jettisoned unoxidized fuel experience secondary combustion and thermal expansion; subsequently, these products of combustion are exhaust vented through nozzle 114 in a direction opposite to the tangental motion of the counterrotating system to which the vanes are affixed, thusly imparting an augmentary reactive thrust to the counterrotating impulse driven system.

Concentric alinement of the aircraft is accomplished by means of varying threaded support 96, which is an integral part of spar 11; set screw 97 is provided to lock the aforesaid adjustment.

What is claimed is:

1. An aircraft, comprising a central vertical shaft and bearing array, upon and horizontally about which are borne, in concentric symmetry, a payload passenger platform and control assemblage, two oppositely rotating airfoil systems respectively comprised of two or more airfoils, one system being driven in rotation by the reaction of two or more tip mounted jet propulsion engines, and the other system driven in counterrotation by the impulse of the exhausted gaseous discharge of the aforesaid jet propulsion engines which impinge upon a series of circumferentially disposed deflection vanes mounted upon the lower section of an aerodynamic duct which encircles the entire unit and which is supported and positioned thereto by being affixed to the extremities of the aforestated impulse driven airfoils, the over-all geometry of the duct acting to channel air flow through the unit and to augment lift by virtue of an air pressure differential between its upper and lower apertures; the airfoil systems providing lift and mobility for both vertical and horizontal flight, which is controlled by means provided for varying the angle of attack of the airfoils of one or both oppositely rotating systems in a symmetrical, uniform manner to afford lift for vertical flight, and in a superimposed, coordinated, variable, asymmetric manner to afford horizontal flight propulsion; a means of controlling platform horizontal angular displacement by increasing frictional resistance upon one or the other counterrotating system is provided; a fuel tank concentrically mounted provided with means of feeding fuel by the centrifugal force causal of its rotation to the respective propulsion engines; a landing gear provided with means of horizontal extension and retraction so as to afford support at rest and avoid obstructing air flow in flight.

2. An aircraft of the character as stated in claim 1, wherein a means of starting the propulsion engines by compressed air and initial firing ignition is provided.

3. An aircraft of the character as stated in claim 1, wherein a compressed air storage tank, in combination with an air compressor driven by an automatically pressure controlled interrotary system power takeoff is provided.

4. An aircraft of the character as stated in claim 1, wherein the special geometry of the deflection vanes provides, in addition to a surface of impingement, a partially restricted enclosure for the further expansion of the heated gases and incidentally rammed air, as well as the regenerative combustion of jettisoned unoxidized fuel and the exhaust venting of all the same at an angle of from 140° to 180° with respect to the vertical plane and in opposition to the tangental motion of the counterrotating system.

5. An aircraft of the character as stated in claim 1, wherein the above aircraft is singly or plurally embodied with an aircraft as an aerodynamic unit thereof.

6. An aircraft of the character as stated in claim 1, wherein the reactive thrust of one rotating airfoil system is supplied by a turbo or fan jet propulsion engine centrally mounted with its high velocity gaseous discharge ducted through two or more airfoils of this system and jet exhausted therefrom with such orientation as to reactively thrust this system in one direction and concurrently direct the exhausted gases upon the deflection vanes, thusly driving the other airfoil system in counterrotation.

7. An aircraft of the character as stated in claim 1, wherein propulsion and lift for horizontal and/or vertical flight is augmented by, or, as in the case of horizontal flight, such may be fully supplied by, conventional propulsion means, either by jet or air screw.

8. An aircraft of the character as stated in claim 1, wherein the payload passenger platform is borne and suspended below the unit.

9. An aircraft of the character as stated in claim 1, wherein the airfoils of the counterrotating system are mounted upon the exterior face of the aerodynamic duct and extend radially therefrom.

10. An aircraft of the character as stated in claim 1, wherein means of controlled rapid discharge of the stored compressed air through the discharge orifice of the jet engine is provided in such a manner as to provide temporary rotation and lift in the event of precipitous engine failure at low altitude, and thereby afford safe landing.

11. An aircraft of the character as stated in claim 1, wherein landing gear of suitable geometry and buoyancy is provided for water landings.

12. An aircraft of the character as stated in claim 1, wherein the aerodynamic duct collar is provided with a means of mounting jet propulsion engines in such a manner as to receive their rammed or ducted air flow supply from the outer periphery of the said collar and to discharge through the said collar tangentially to deflection vanes mounted upon and about the inner counterrotating air foil system driven by the impulse of the discharge of the aforesaid jet propulsion engines; the aforestated outer array of jet propulsion engines may be the sole reaction driven system or the outer system wherein both outer and inner air foil systems which do in fact constitute the rotating and counterrotating systems as defined in claim 1, are in this instance each being driven by reaction and at the same time their respective discharges are each driving the other by impulse.

13. An aircraft of the character as stated in claim 1, wherein one or the other or both air foil systems are only activated in uniform variation of angle of attack solely to provide lift and wherein means are provided to mount deflection air foils with their lateral axes in the horizontal plane of the craft at or near the base of the discharge orifice of the aerodynamic duct so as to be controllably activated and angled to deflect a portion of the said duct discharge air flow in a specific direction and thusly supply motivation and control for horizontal flight.

14. An aircraft of the character as stated in claim 1, wherein means are provided for a second fuel tank mounted in concentric symmetry with the vertical axis of the aircraft but upon and with the counterrotating system so that the aircraft will have two separate fuel tanks, each pertaining to a distinctly rotating system, and a means of automatically and continuously transferring fuel to that tank which is directly supplying fuel feed to the jet propulsion engines from the other tank in such quantity as to maintain the respective masses of the rotating and the counterrotating systems relatively, within limits, constant each with respect to the other in order to balance evenly the diametrically opposed reactions of gyroscopic precession, acting at right angles to the left and to the right of the couple imposed upon the vertical axis of the aircraft by the disbalanced reaction of the air foils in horizontal canted flight attitude.

15. An aircraft of the character as stated in claim 1, wherein means are provided to maintain the operator and passengers of the aircraft in proper posture with respect to the horizon when this aircraft is pitched over by the horizontal flight control overpowering the vertical gyroscopic stability and placing the aircraft in flight attitude with its vertical axis in, or nearly in, a plane parallel with the surface of the earth.

* * * * *